United States Patent [19]

Kinney et al.

[11] Patent Number: 4,857,726
[45] Date of Patent: Aug. 15, 1989

[54] METHOD TO DECODE RELATIVE SPECTRAL DATA

[75] Inventors: Terrance R. Kinney; Eric M. Arnett, both of South Bend, Ind.

[73] Assignee: Allied-Signal Inc., Morristown, N.J.

[21] Appl. No.: 161,533

[22] Filed: Feb. 29, 1988

[51] Int. Cl.$^4$ .......................... G01J 3/50; H01J 5/16; H01J 40/14

[52] U.S. Cl. .................................. 250/226; 250/227; 370/3

[58] Field of Search .................. 370/3; 455/600, 605, 455/608, 611; 250/226, 227, 231 R

[56] References Cited

U.S. PATENT DOCUMENTS 3,845,294 10/1974 Irdig et al. .............................. 370/3

4,223,216 9/1980 Quick et al. .......................... 250/227

Primary Examiner—David C. Nelms
Assistant Examiner—Eric F. Chatmon
Attorney, Agent, or Firm—Leo H. McCormick, Jr.; Ken C. Decker

[57] ABSTRACT

A method of encoding and decoding a binary modulated light spectrum to recover encoded intelligence. The method enables reliable and accurate decoding of wave division multiplexed data. The method incorporates a step of encoding data and a step of decoding the data which employs a photo-detector array. This method of encoding and decoding data compensates for variations in signal level, spectral position and spectral width with no degradation in reconstructed data.

16 Claims, 2 Drawing Sheets

TYPICAL SPECTRAL DATA
GENERATION SYSTEM

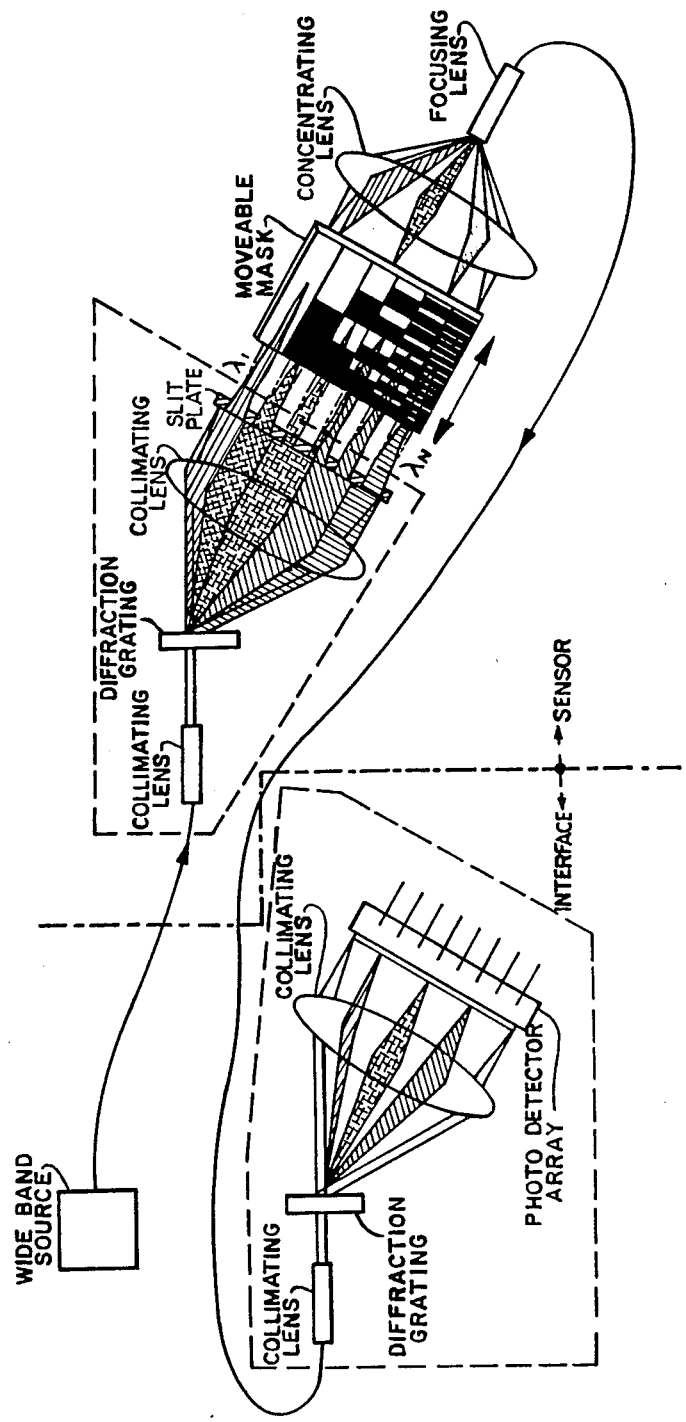
FIG. 2  TYPICAL SPECTRAL DATA GENERATION SYSTEM

METHOD TO DECODE RELATIVE SPECTRAL DATA

The present invention relates to optical data signals and in particular to a method of decoding a binary modulated light spectrum to recover intelligence encoded therein.

In commonly assigned, copending U.S. patent application Ser. Nos. 124,535, filed Nov. 23, 1987; and 004,735, filed Jan. 6, 1987, and now U.S. Pat. No. 4,778,270 and U.S. Pat. No. 4,223,216, there are disclosed an optical spectral analyzer and a spectral optic temperature sensor, and a frequency multiplexed optical positioned sensor, respectively. In these applications and patent, the various devices utilize an ordinary, wide band light beam as a transmitting medium. The light beam is dispersed to generate an optical spectrum and the individual elements of the spectrum are then modulated and the modulated spectrum thereafter recombined. Subsequently, the recombined beam is again separated into an optical spectrum comprised of the modulated spectral elements. Thereafter, the individual spectral elements are analyzed to recover the modulated intelligence. Typically, the spectral elements are transmitted or blocked as a function of a parameter such as position, temperature, or the like to produce binary coded data.

In the recovery of this coded data, it has been found that variations in the light beam caused by factors such as temperature variations in the light source, dirt and the like effecting optical components and similar noise factors, as well as variations in sensors and optical characteristics of elements in the various systems, can produce substantial apparent variation in transmitted data resulting in system errors. Accordingly, there exists a need to provide a method of decoding the spectral data produced and transmitted by such devices which will compensate for system variation and substantially eliminate data transmission errors.

Broadly, the present invention discloses a method for encoding and decoding relative spectral data. The encoding steps are as follows: generating an always on first spectral element proceeded by an always off spectral element to define a start bit pattern; this start bit pattern is followed by spectral elements which are generated on or off with respect to a portion (approximately half) of a set of data bits currently being encoded; followed by a generated center always on spectral element proceeded by an always off spectral element; followed by spectral elements generated on or off with respect to the remaining portion of the set of data bits being encoded; followed by a generated always off spectral element; and proceeded by an always on end spectral element. The relative spectral data decoding steps are as follows: (1) determining the position of the rising edge of the first spectral element; (2) determining the position of the falling edge of the last spectral elements; and (3) calculating the central position of each data encoded spectral element from the total quantity of spectral elements. Preferably, the entire spectrum is intercepted by an array of photo responsive devices to develop high level and low level spectral curves. High and low threshold spectral magnitude curves are derived from the high and low spectral curves to provide threshold levels which are compared to detector output levels, thus producing low and high logic levels corresponding to the data bits originally encoded. Prior to spectral data comparison with the threshold levels, the data maybe statistically analyzed by comparing current data values with preceding data values. A hysteresis function for stabilizing the data may be produced by comparing high or on spectral element magnitudes with preceding low or off spectral thresholds and, conversely, comparing current low or off data bytes with preceding high or on spectral thresholds.

It is therefore an object of the invention to provide a method for decoding relative spectral data.

It is another object of the invention to provide a method which eliminates errors in data decoding.

Yet another object of the invention is to provide a method in which a data spectrum is formed and segmented to provide a spectrum of clearly defined magnitude and spectral increments.

Another object of the invention is to provide a method in which statistical methods are utilized to further increase data accuracy.

Yet another object of the invention is to provide a method in which a spectral magnitude envelope is first defined and then high and low data thresholds established as reference values for data analysis.

Another object of the invention is to provide a method which enables the accurate and reliable transmission of binary coded spectral data.

Another object of the invention is to provide a method which enables the generation and transmission of spectral data over a single optic fiber utilizing an ordinary wide band beam light of the type emitted by a light emitting diode.

BRIEF DESCRIPTION OF THE DRAWINGS

These and other objects and purposes of the invention will be best understood in view of the following detailed description of the invention taken in conjunction with the appended drawings wherein:

FIG. 2 is a blocked diagram of a typical data generation system which uses the inventive method of decoding a binary modulated light spectrum.

DESCRIPTION OF THE PREFERRED EMBODIMENT

Figure 1:
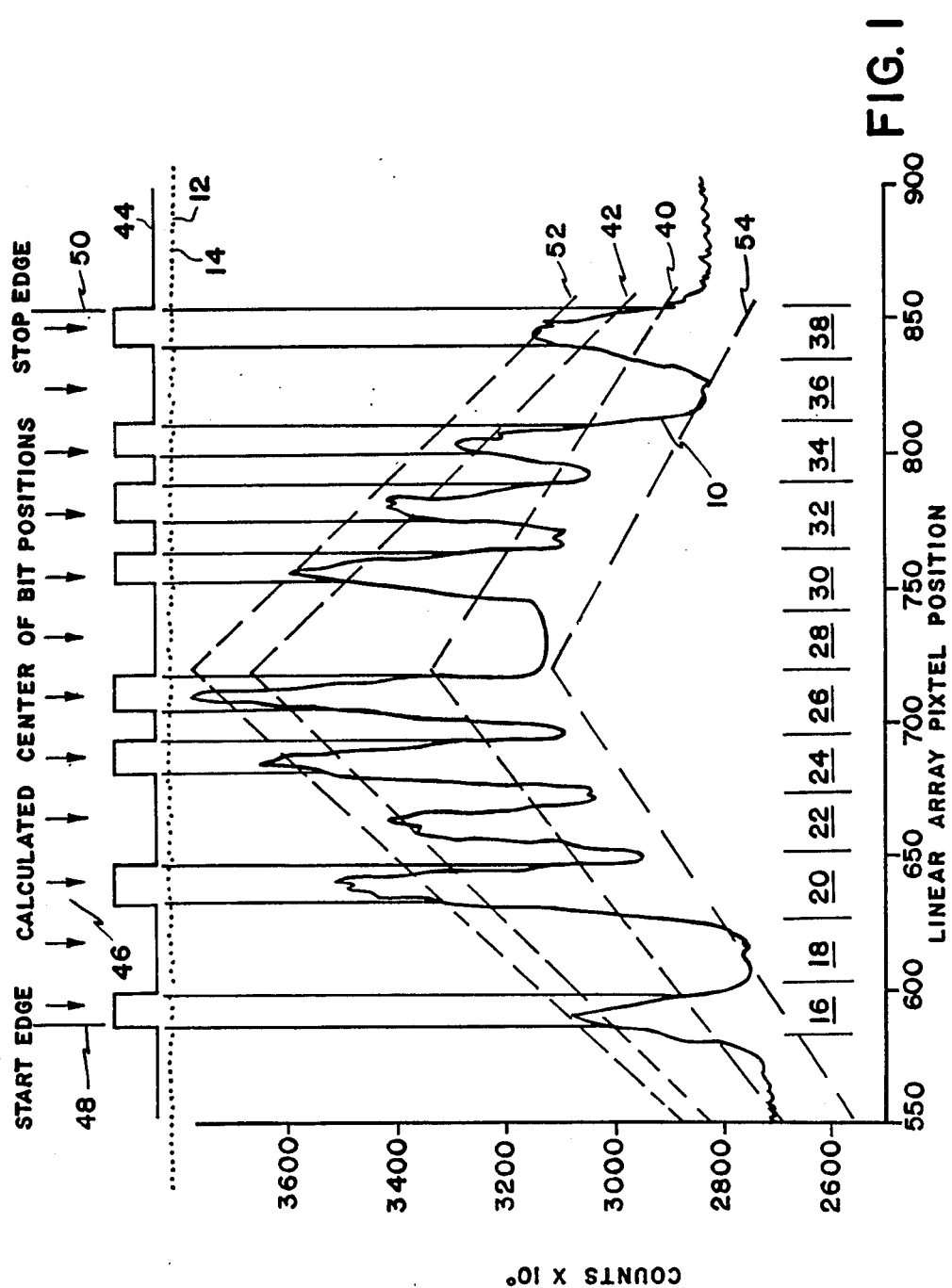
FIG. 1 is a multi-access chart showing the relationship between typical spectral data, a photo detector array, and binary data generated therefrom.

Referring now to FIG. 1, there is shown a typical spectral output curve 10. Curve 10 graphically depicts light intensity as a function of wave length with the intensity of the light being indicated in counts. This spectral output curve 10 is representative of a typical modulated light spectrum such as would be generated in a system as depicted in FIG. 2 of the type disclosed in U.S. patent application Ser. Nos. 124,535, filed Nov. 23, 1987; and 004,735, filed Jan. 6, 1987.

The output from the photo detector array 2 shown in FIG. 2 is a spectrum which is in turn intercepted by a linear pixel array of photo detectors 12 shown in FIG. 1. The array 12 may comprise a semi-conductor having a multiplicity of individual photo detectors 14 disposed in side by side relationship. There may be as many as one thousand separate detectors 14 in the array 12. The physical dimension in the array 12 is greater than the width of the modulated spectral curve 10 such that the upper and lower wave length limits of the modulated spectral curve 10 infringe upon the array 12 between its physical extremities. The spectrum is modulated such that individual elements of the spectrum such as elements 16 through 38 in FIG. 1, represent an on or an off binary state of data bits which have been encoded.

In practice it has been determined that the spectrum generated by a particular light source and operation with a specific optical system varies. These variations occur as a result of temperature variations in the light source, variations in optical elements, dirt and element to element variations in the photo-detector array 12. Accordingly, it cannot be assumed that the spectrum will have a precisely defined and repeatable band width or envelope; that the individual spectral elements 16 through 38 will have a constant width and location; or that the spectrum will infringe upon the photo-detector array 12 in precisely the same way from unit to unit. Accordingly, it was necessary to devise a means applicable to a modulated spectral data beam that insures that the transmitted data is accurate.

To insure that the transmitted data is accurate, the method of the present invention requires that the first and last spectral elements 16 and 38, respectively, of the modulated spectral curve 10 be provided as an "always on" spectral element and that the second and second to last spectral elements 18 and 36, respectively, be provided as an "always off" spectral element. Additionally, an "always on" spectral element proceeded by and "always off" spectral element 26 and 28, respectively, is provided substantially towards the center of the modulated spectrum.

The encoding steps are as follows: generating an always on first spectral element 16 proceeded by an always off spectral element 18 to define a start bit pattern; this start bit pattern is followed by spectral elements which are generated on or off with respect to a portion (approximately half) of a set of data bits being encoded; followed by a generated center always on spectral element 26 proceeded by an always off spectral element 28; followed by spectral elements generated on or off with respect to the remaining portion of the set of data bits being encoded; followed by a generated always off spectral element 36; and proceeded by an always on end spectral element 38.

Decoding the spectral data comprises the steps of first determining the central position of each spectral element 46 by determining the position of the rising edge of the first spectral element 48, followed by determining the position of the falling edge 50 of the last spectral element, taking the difference of these two positions, dividing the difference by the difference of the total number of spectral elements minus one-half, then multiplying this quotient by the difference of each spectral data element minus three-quarters, and then adding to this quantity the position of the rising edge of the first spectral element 48 determined previously. This process can be shown more clearly in the equation:

$$P_{bit} = (N_{bit} - 0.75) \times \frac{(P_{stop} - P_{start})}{(N_{total} - 0.5)} + P_{start}$$

Where:
$N_{bit}$ is the spectral data bit for whose position is sought;
$P_{bit}$ is the location of the center of spectral bit 'N';
$P_{start}$ is the location of the rising edge of the first spectral element;
$P_{stop}$ is the location of the falling edge of the last spectral element;

$N_{total}$ is the total number of spectral elements.

The process of decoding the spectral data is continued by the additional steps of creating a low level curve 54 and a high level curve 52 by linear interpolation between adjacent spectral element magnitudes of always off or always on spectral elements, respectively, followed by generating a pair of threshold curves from the previous low level and high level curves 54 and 52, respectively. For example, a low threshold curve 40 is generated whose magnitude is a percentage of the high and low level curve difference above the low level curve 54, and a high threshold curve 42 is generated whose magnitude would also be a percentage of the high and low level curve difference above the low level curve 54, thus providing thresholds levels to compare the magnitude of the modulated spectral curve 10.

A hysteresis function for stabilizing the data may be produced by comparing high or on spectral element magnitudes of the modulated spectral curve 10 with preceding low or off spectral thresholds 40 and, conversely, comparing current low or off spectral element magnitudes of the modulated spectral curve 10 with preceding high or on spectral thresholds 42, thus producing low and high logic levels 44 corresponding to the data bits originally encoded, when correlated with the data bit position information 46.

The data further maybe statistically analyzed by comparing current elemental magnitudes of the modulated spectral curve 19 with preceding and following elemental magnitudes. This statistical analysis would consist of an algorithm which would average the magnitudes of a quantity of local elemental magnitudes of the modulated spectral curve for data each element of the modulated spectral curve prior to the threshold comparison, providing a smoothing of the modulated spectrum data.

What we claim is:

1. A method for decoding relative spectral data comprising the steps of:
    generating a spectrum of light having at least a predetermined minimum bandwidth, said bandwidth having discrete spectral elements of radiant energy;
    modulating said discrete spectral elements to generate a modulated spectrum where a spectral element is a spectral portion of the generated spectrum and where an on spectral element is a relative high intensity as compared to adjacent spectral elements and an off spectral element is a relative low intensity as compared to adjacent spectral elements, said modulated spectrum having:
      (a) an always on first spectral element followed by an always off spectral element;
      (b) an always on last spectral elmement preceded by an always off spectral element; and
      (c) modulating all other elements of said spectrum as a function of data bits from a data source;
    interpreting said modulated spectrum with an array of detectors having spectral response including said bandwidth such that individual elements of said spectrum engage upon at least one of the detectors of said array; and
    determining the positions of said individual spectral elements by analyzing the positions of said first spectral element and last spectral element.

2. The method of claim 1 wherein said determining the position of the individual spectral elements further includes the steps of:
    determining the central position of each spectral element by determining the position of the rising edge of the first spectral element, followed by determining the position of the falling edge of the last spectral element, obtaining the difference of these two positions and dividing this difference by the difference of the total number of spectral elements minus one-half to obtain a quotient, multiplying the quotient by the difference of each spectral element minus three-quarters, and then adding to this quantity the position of the rising edge of the first spectral element.

3. The method of claim 1 further including the step of:
generating high level and low level curves by linear interpolation between the spectral element magnitudes of always off or always on spectral elements, respectively.

4. The method of claim 1 wherein said modulated spectrum includes an always on spectral element followed by an always off spectral element located near the center of the modulated spectrum.

5. The method of claim 4 further including the step of:
generating high level and low level curves by linear interpolation between adjacent spectral element magnitudes of always off or always on spectral elements, respectively.

6. The method of claim 3 further including the step of:
generating at least one threshold curve from said high level and low level curves.

7. The method of claim 5 further including the steps of:
generating at least one threshold curve from said high level and low level curves.

8. The method of claim 6 wherein said threshold curve is used to derive high and low logic levels by comparison with said modulated spectrum.

9. The method of claim 7 wherein said threshold curve is used to derive high and low logic levels by comparison with said modulated spectrum.

10. The method of claim 6 wherein said threshold curves is a percentage of the difference between said high level and low level curves summed to the low level curve.

11. The method of claim 7 wherein said threshold curve is a percentage of the difference between said high level and low level curves summed to the lower level curve.

12. The method of claim 6 further including the step of:
using a hysteresis function between said modulated spectrum and said threshold curves to derive high and low logic levels.

13. The method of claim 7 further including the step of:
using a hysteresis function between said modulated spectrum and said threshold curves to derive high and low logic levels.

14. The method of claim 1 wherein spectral element position information is correlated with logic levels generated from said modulated spectrum to derive the originally encoded data bits.

15. The method of claim 8 further including the step of:
statistically analyzing said modulated spectrum to modify and smooth said modulated spectrum prior to the generation of high and low logic levels and the high level and low level curves.

16. The method of claim 9, further including the step of: statistically analyzing said modulated spectrum to modify and smooth said modulated spectrum prior to the generation of high and low logic levels and the high level and low level curves.

* * * * *